United States Patent [19]
Magliaro

[11] 3,868,135
[45] Feb. 25, 1975

[54] DEVICE FOR REMOVING ANIMAL DROPPINGS

[76] Inventor: Luke P. Magliaro, 79 Passaic Ave., Berkeley Heights, N.J.

[22] Filed: Apr. 23, 1973

[21] Appl. No.: 353,695

[52] U.S. Cl............. 294/1 R, 294/19 R, 294/50.9, 15/257.6, 119/1
[51] Int. Cl. .................... A01k 23/00, A01k 29/00
[58] Field of Search............ 15/104.8, 257.1, 257.2, 15/257.6; 119/1; 294/1 R, 19 R, 50.9, 53.5, 55

[56] References Cited
UNITED STATES PATENTS

| | | | |
|---|---|---|---|
| 507,826 | 10/1893 | Miller | 15/257.6 X |
| 3,052,214 | 9/1962 | Johnson | 119/1 X |
| 3,645,578 | 2/1972 | Renfroe | 294/53.5 |
| 3,733,098 | 5/1973 | Tobias | 294/1 R |
| 3,738,697 | 6/1973 | Kahan | 294/19 R |

FOREIGN PATENTS OR APPLICATIONS

| | | | |
|---|---|---|---|
| 351,866 | 4/1922 | Germany | 15/257.6 |
| 1,142,678 | 4/1957 | France | 294/19 R |

*Primary Examiner*—Daniel Blum
*Attorney, Agent, or Firm*—Martha G. Pugh, Esq.

[57] ABSTRACT

A hinged container, including a disposable liner bag, is carried in closed position on the end of a long handle by the person walking a dog or other animal. The container is opened by manipulating a cable mechanism in the handle for placing the hinged container beneath the animal to receive the droppings in the open liner bag. The handle is then operated to close the container, together with the liner bag, for transporting in closed position to the disposal point, where the bag is sealed and removed.

6 Claims, 8 Drawing Figures

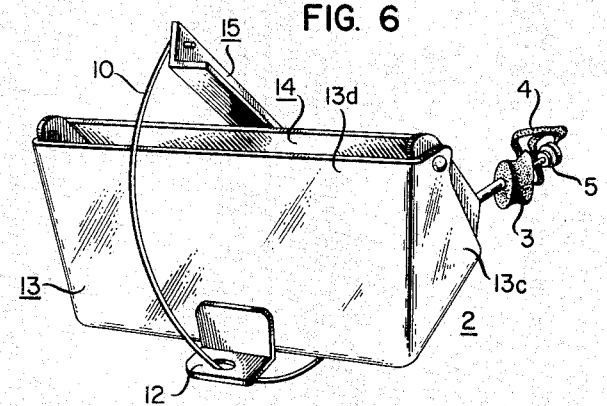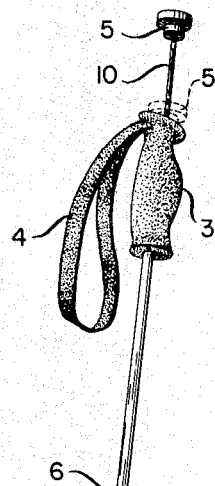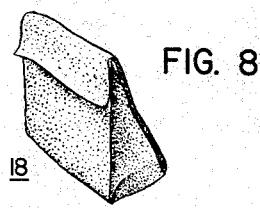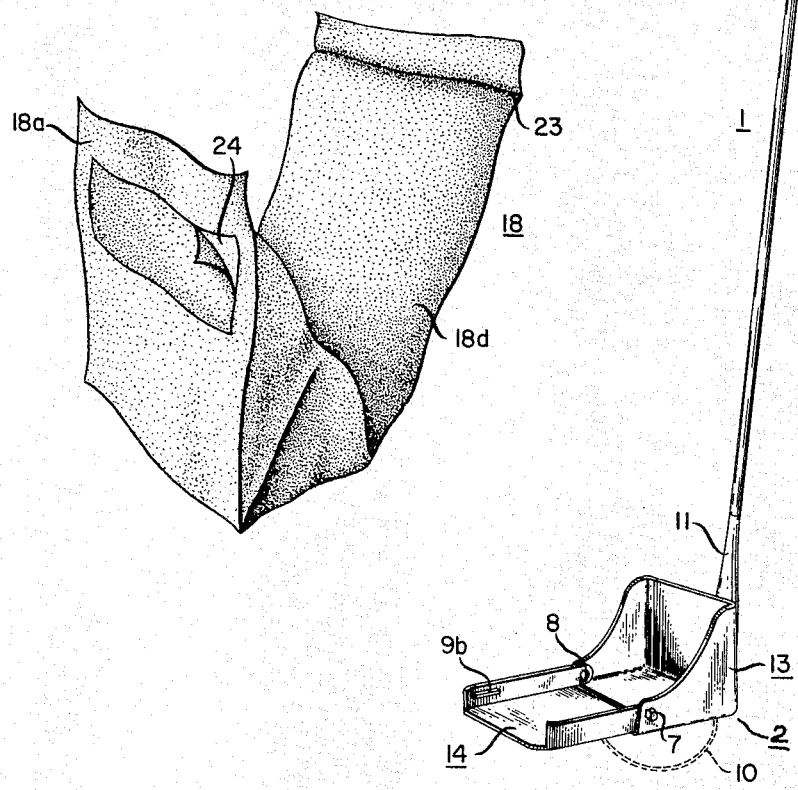

3,868,135

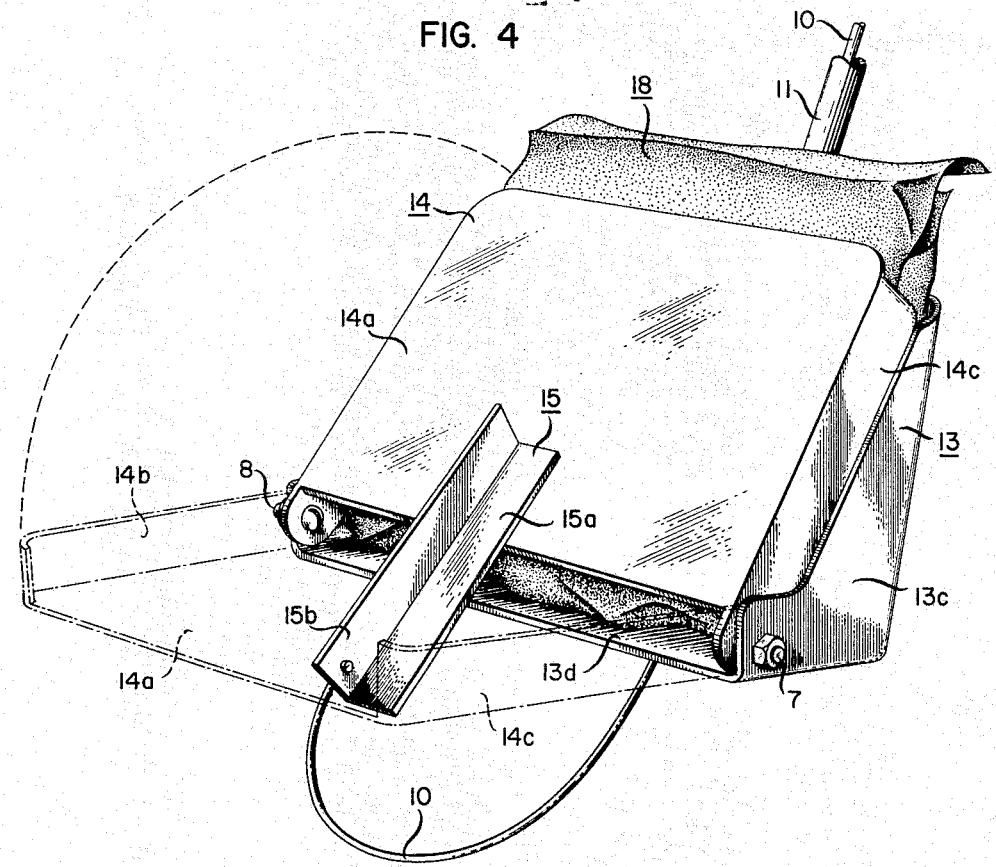
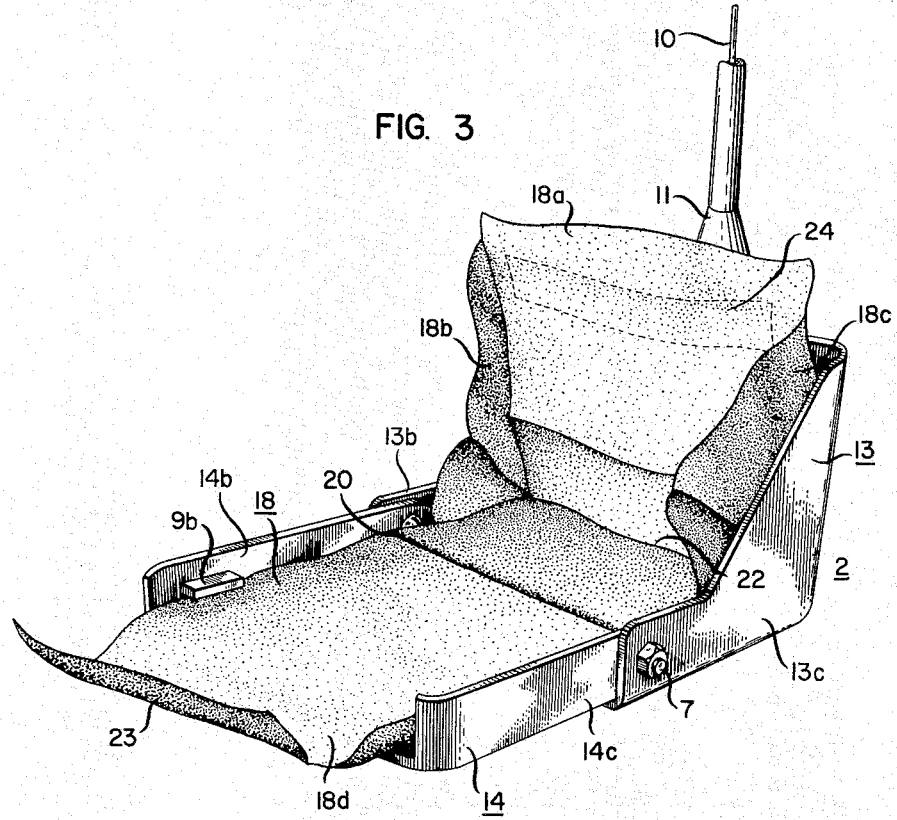

DEVICE FOR REMOVING ANIMAL DROPPINGS

BACKGROUND OF THE INVENTION

This relates in general to the removal of animal droppings; and more particularly, to a device to facilitate the disposal of dog feces.

Recently, in the media there has been much adverse criticism of dog owners for permitting their animals to deposit their droppings, in public places, and on the property of other persons. In a number of urban areas legislation has actually been passed requiring dog owners to clean up after their pet in public areas. Various devices have been provided in the prior art for performing this chore.

All of the prior art devices require that the dog walker carry one or more extra tools, in addition to handling the leash. Some of the tools require bending and scooping. Others involve scissor-like devices which operate on longer handles. In order to solve the problem of how to dispose of the fecal matter after it has been removed, two recent prior art devices are provided with bags. One of these has a rigid frame for accommodating the bag which must be installed and removed by hand. Another device employs a clamp-like mechanism which operates to impose a bag over the material to be removed, which is an awkward operation. In addition, this latter device is fairly complex mechanically, involving an internal spring moving in a sleeve and a number of moving parts which may become out of order or difficult to operate because of rust or other deterioration.

SUMMARY OF THE INVENTION

Accordingly, it is the object of the present invention to provide a device for removing and disposing of animal droppings which is simpler to construct and manipulate than those of the prior art.

This and other objects are realized in the device in accordance with the present invention which involves a long, hollow handle to the lower end of which is attached a two-part shovel-like receptacle with a hinged closure which is moved from closed to open position by means of a cable manipulated from the upper end of the handle. The receptacle is designed to accommodate a removable bag of paper or the like, initially open at the top and having a flap which is folded over by closure of the receptacle after the droppings have been deposited. The filled bag is then carried by the closed receptacle for deposit in the nearest trash or garbage can, preferably without the necessity of handling.

An additional feature of the present invention is a clip to which the animal leash is attached in order to avoid the necessity for carrying or holding an extra device while walking the animal.

The principal advantage of the present invention is the simplicity with which it operates, having merely a single cable to be manipulated by the operator in a standing position and a single hinged moving part which is attached to the cable and serves to open and close the receptacle. It will be apparent that the device is easily fabricated from either metal or nonmetallic materials, such as plastic, wood, etc.

Other objects, features and advantages of the present invention will be better understood from a study of the attached drawings.

BRIEF DESCRIPTION OF THE DRAWINGS

FIG. 1 is a perspective showing of the combination device of the present invention in open position;

FIG. 3 is a perspective showing of the container in open position with the liner bag in place;

FIG. 4 is a perspective showing, looking from above, of the container in closed position with the liner bag with the flap folded over;

FIG. 6 shows the container portion turned on its back side to show the operation of the closure control mechanism;

FIG. 7 shows the bag removed from the container; and

FIG. 8 shows the bag sealed and ready for refuse deposit.

DETAILED DESCRIPTION OF THE DRAWINGS

Figure 2:
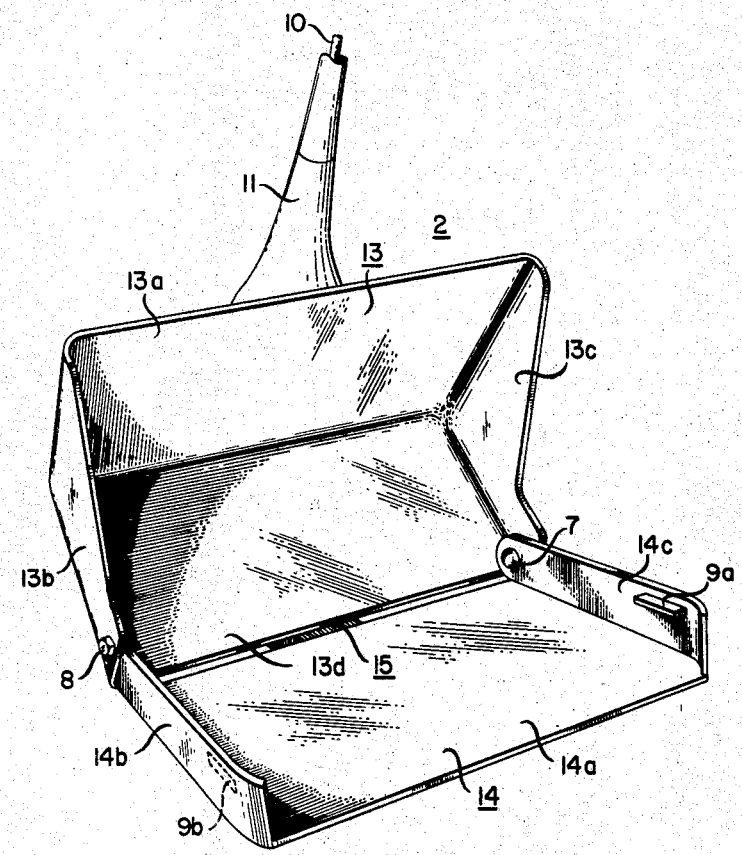
FIG. 2 is an enlarged perspective showing, looking into the container mechanism in open position without the liner bag.

Referring to FIG. 1 of the drawings, there is shown the overall device 1 of the present invention which comprises a receptacle 2 designed to set at ground level. This is connected to a tubular support 6 at the upper end of which is a hand grip 3 having a carrying strap 4 attached to one end. At the upper end of the hand grip 3 is a handle 5 which is attached to one terminal of a wire cable 10. The latter extends axially through the length of the tubular support 6 and is fastened at its other terminal to manipulate the receptacle 2 from closed to open position in a manner which will be explained presently.

Referring now to FIG. 2, the receptacle 2 has a substantially stationary part 13 and a movable part 14. The part 13 comprises a partial box-like structure having a back wall 13a and side walls 13b and 13c, all of which are rigidly fixed to three sides of a base 13d. All of these parts may be formed, for example, of rigid materials such as metals, including aluminum, galvanized iron, wood, or any of the well-known rigid plastic materials, such as, for example, ABS resins, pvc-acrylic sheeting, high density polyethylene or any substantially rigid plastic material which can be formed into sheets, say 1/16 inch thick, and/or molded into the desired shape in any manner well-known in the art. The base 13d is preferably a rectangle about 3 inches by 6 inches, to which the back 13a and the sides 13b and 13c are molded or otherwise connected at substantially right angular junctions. The back 13a is also rectangular in form, say 3¼ inches by 6 inches, and the sides 13b and 13c are substantially in the form of right angle triangles, the right angle edges molded or joined in each case integrally with the base 13d and back 13a, the hypotenuse of the triangle being the open end.

Coupled to stationary member 13 is movable member 14 which comprises a base 14a having dimensions 4 inches by 6 inches and shallow parallel flanges 14b and 14c, bent normally upward at its two sides to a height of 9/16 inch. The member 14a is coupled along the lower edge of the base 13d of the receptacle 2 by means of a pair of pivots 7 and 8 which may assume any conventional form, such as ordinary bolts, which pass through and couple the two corners together. Near the inside ends of the sides 14b and 14c are a pair of grips or bosses 9a and 9b (not shown) which are, for example, ⅜ inch up from the base and ⅜ inch in from the front edge. These take the form of rectangular protuberances parallel to the base, and having dimensions of, for example, about ½ inch long by 1/16 inch thick and 3/32 inch wide, which serve to hold the replaceable bag in place during the use of the device.

It will be understood, of course, that the back and sides of the stationary part 13 of receptacle 2 and of its movable counterpart 14 need not necessarily be rectangular in form, as indicated in the present example; but that the stationary part can be molded as a single open-ended scoop to one edge of which a matching hinged extension, also molded in one piece including the protuberances 9a and 9b, can be attached.

Connected externally to the upper center portion of back 13a, in rigid relation, is a support 11 in which is mounted the terminal end of the tubular shaft portion 6. For the comfort of the user, the axis of the latter is preferably attached so that the shaft 6 projects backward from the vertical back portion 13a at a slight angle of about 12°. For the purposes of the present example, the cable 10 is formed from 14 gauge stainless steel cable wire, about 3 feet, 8 inches long. At the lower end of the support 11, which is hollowed out to accommodate the passage of the cable 10, is an opening 11a through which the cable 10 emerges for passage through an eyelet 12, the hooked end of the cable terminating in and being fixed on one end to a lever mechanism 15. The lever mechanism 15 is rigidly fastened at one of its ends to the bottom of the pivotally connected edge of movable base 14a, being centered between and substantially parallel to the sides 14b and 14c. The length of cable 10 is adjusted so that when the handle 5 is pulled out to its full length to hold the base 14a in open position, the cable is taut.

Referring to FIG. 4, which shows movable portion 14 in closed position, one is able to see the position of the lever mechanism 15 to which the terminal of the cable 10 is attached. It is seen that the lever mechanism 15 is preferably formed from an L-section channel of a rigid material, such as aluminum, galvanized steel or the like, or rigid plastic, comprising a base portion 15a which is 3 inches long and ½ inch wide, and a rectangularly projecting flange 15b which matches the length and width of the base 15a. Near one end of the latter, the terminal hooked portion of the cable 10 is rigidly connected by means of a bolt or screw or by any other means well-known in the art. It will be noted from FIG. 4 that when the receptacle 2 is in closed position the lever 15 extends outwardly from the closed bottom edge of 14a.

Figure 5:
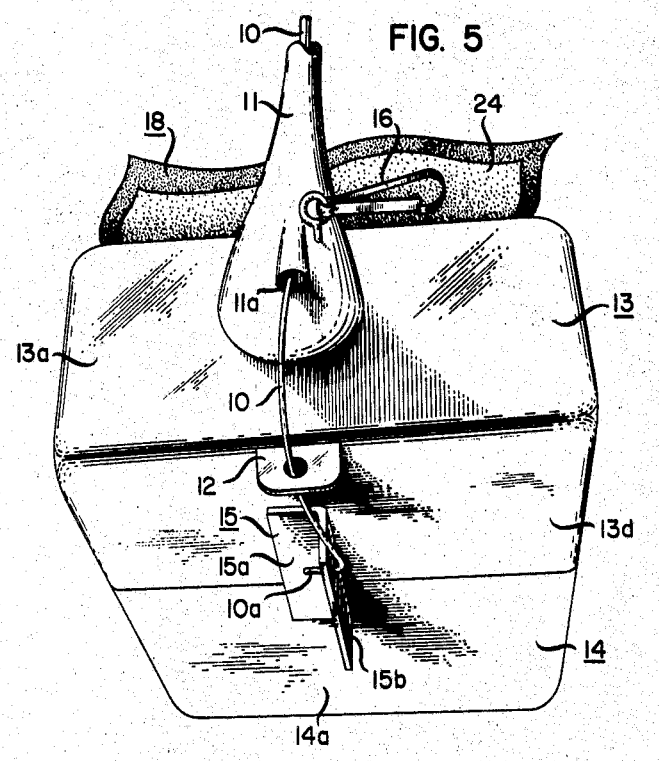
FIG. 5 is a perspective view of the container in closed position, looking from below.

FIG. 5 is a bottom view, showing the position of lever 15 when the receptacle 2 is in open position. In this case, lever 15 extends from the base 14a of the movable portion to which it is attached beneath the base 13d of the stationary portion. The bases 13d and 14a are thereby maintained substantially in the same plane. The cable 10 passes through the opening 11a in the support 11 and through a supporting eyelet 12 connected externally to the lower part of the back wall 13a, terminating in the rigid hook-like connection to the lever 15. When cable 10 moves downward in the showing of FIG. 5, the lever 15 is caused to pivot about the external edge of 13d, causing hinged member 14 to close, as shown in FIGS. 4 or 6. Clip 16, which is connected to the support member 11, is a conventional form of connection for the animal leash.

FIG. 3 shows a specially designed paper bag held in place by the grips or bosses 9b and 9a (not shown) while the device is in open position. It will be noted that the bag 18, in open position, has a short side about 4½ inches high and 5⅞ inches wide, which is placed in position against the back 13a of the container 2. Back flap 18a is connected between a pair of side flaps 18b and 18c which respectively rest against the corresponding sides 13b and 13c of the receptacle 2. These side flaps are substantially triangular in shape, extending about 2 inches along the bottom edge and about 4 inches high. A lip approximately ½ inch wide extends beyond the sides at the top end of the back flap 18a. Each of these triangular flaps 18b and 18c bears a crease for storage purposes at about a 45° angle with the side and bottom portions. Extending outwardly from the crease 22 at the bottom of back flap 18a, when the bag is in place, is the base flap 18d which is approximately 5⅞ inches wide, conforming in width to the back flap 18a, and about 8⅔ inches long, extending beyond the end of the base 14a of the movable portion 14. It will be noted that when in position the flap 18d contains a first fold 20 roughly conforming to the inner pivotted edge of base portion 14a. The portion of flap 18d extending beyond the outer edge of the latter contains a second fold 23 parallel to and about 1¼ inches from the end. Centered on the outside of the back 18a of the bag is a length of pressure tape 24 (see FIG. 7) which extends substantially parallel to the edge, and approximately ½ inch down from the top. This is adapted, upon removal of the protective covering, to seal the lip of flap 18d in anticipation of removal of the bag from the receptacle 2.

In using the device, the dog walker may connect the leash of his dog to the clip 16 and carry the device 1 with the receptacle 2 in closed position, as shown in FIG. 4. The receptacle has been prepared in advance by placing the disposable bag 18 in position, as shown in FIG. 3. At the point when the animal's actions make it necessary, the handle 5 is pulled up, opening the receptacle 2, which is put in place beneath the animal, catching the droppings in the open bag 18. The receptacle 2 is then closed by depressing the handle 5 and carried, in closed position with the dog still on the leash, to the place of disposal. It will be noted that in so called "closed" position, there is a substantial clearance, an inch or so wide, between the top end of movable member 14 and the top of stationary member 13, through which the upper ends of the liner bag 18 protrude. At this point the bag may be sealed without actually removing it from receptacle 2, by overlapping the ends and removing the protective coating from pressure tape 24. The sealed bag 18 is then preferably removed without handling, by simply opening and upending receptacle 2. Alternatively, the closed bag 18, as shown in FIG. 8, can be removed manually.

It will be apparent that within contemplation of the invention there are other forms than the specific structure described herein by way of illustration; and, that the scope of the present invention is limited only by the claims set forth hereinafter.

What is claimed is:

1. A device for removing animal droppings which comprises in combination:

a receptacle constructed to operate from closed to open position, said receptacle comprising a partial enclosure including a flat base member partially closed on three sides by a back wall between two side walls, and open at the top and along one edge, a hinged closure pivotally connected along said one edge, said hinged closure forming in open-faced position an extension in substantially the same plane as said base member, a long hollow shaft rigidly fastened externally to the back of said partial enclosure, and positioned to extend upwardly when said base member is seated horizontally, a mechanism for opening and closing said receptacle comprising an elongated lever on the under side of said base member extended in a direction substantially normal to said open edge and having one end fixed externally to the extension of said base member in a position substantially midway between said side walls, and having the other end free, a cable connected at one terminal to the free end of said lever and passing slidably through said shaft, said cable terminating at its other end in a handle adjacent the top of said shaft for slidably manipulating said cable in said shaft to move said closure from closed to open position, and vice versa, and means for accommodating and holding one flap of a disposable container in place on the face of said hinged extension.

2. The combination in accordance with claim 1 wherein the system comprising said handle, cable and lever is constructed to open said hinged closure when said cable is pulled taut by said handle and at least partially to close said hinged closure over said enclosure when said handle is depressed.

3. The combination in accordance with claim 1 said hinged closure comprising in addition to the extension of said base member extensions of said side walls, wherein said means for accommodating and holding in place said disposable container comprises a pair of bosses respectively positioned on opposite inner side walls of said extension for holding in place one flap of a disposable container.

4. The combination in accordance with claim 3 including a disposable bag, said bag having a first crease substantially approximating the position of the junction between the base member and back wall of said receptacle when in place in said receptacle, a first shorter flap constructed to extend vertically from said first crease a substantial height above the top edge of said back wall, a second elongated flap substantially conforming to the inner width of said receptacle, constructed to extend from said first crease in a substantially normal plane to beyond the end of said hinged closure in open position and constructed for accommodation beneath said bosses, said elongated flap having a second crease substantially parallel to said first crease and substantially conforming to the pivotted edge of said hinged closure, side portions connected between said first and second flaps creased to conform when in place to the junctions between the back and side walls of said receptacle and extending substantially above the side walls of said receptacle, and said bag having sealing means near the top external face of said first flap, whereby when said hinged closure is closed against said receptacle said second flap is folded over so that the edge thereof is adjacent the upper edge of said first flap, the two flaps being constructed for folding and sealing together for removal of said bag from said receptacle.

5. The combination in accordance with claim 4 wherein when said receptacle is in closed position a longitudinal gap is provided between the back edge of said enclosure and the forward edge of said hinged closure.

6. The combination in accordance with claim 5 wherein the top edges of said shorter flap and said elongated flap extend outwardly through said gap in slightly overlapping relation when said receptacle is in closed position.

* * * * *